United States Patent
Dettori et al.

(10) Patent No.: US 9,547,534 B2
(45) Date of Patent: Jan. 17, 2017

(54) AUTOSCALING APPLICATIONS IN SHARED CLOUD RESOURCES

(71) Applicant: International Business Machines Corporation, Armonk, NY (US)

(72) Inventors: Paolo Dettori, Hartsdale, NY (US); Xiaoqiao Meng, Millwood, NY (US); Seetharami R. Seelam, Chappaqua, NY (US); Peter H. Westerink, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 78 days.

(21) Appl. No.: 14/511,700

(22) Filed: Oct. 10, 2014

(65) Prior Publication Data

US 2016/0103717 A1   Apr. 14, 2016

(51) Int. Cl.
*G06F 9/54* (2006.01)
*G06F 9/455* (2006.01)

(52) U.S. Cl.
CPC .......... *G06F 9/542* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| 8,572,612 B2* | 10/2013 | Kern | G06F 9/5072 717/177 |
| 9,069,606 B2* | 6/2015 | Donahue | G06F 9/45558 |
| 2011/0078303 A1* | 3/2011 | Li | G06F 9/505 709/224 |
| 2011/0258621 A1* | 10/2011 | Kern | G06F 9/5072 718/1 |
| 2012/0254443 A1* | 10/2012 | Ueda | H04L 67/1008 709/226 |
| 2013/0007753 A1 | 1/2013 | Jain | |
| 2013/0086273 A1 | 4/2013 | Wray et al. | |
| 2013/0174149 A1* | 7/2013 | Dasgupta | G06F 9/5077 718/1 |
| 2013/0198319 A1* | 8/2013 | Shen | G06F 9/455 709/217 |
| 2013/0290538 A1 | 10/2013 | Gmach et al. | |
| 2014/0040885 A1* | 2/2014 | Donahue | G06F 9/45558 718/1 |
| 2014/0082612 A1* | 3/2014 | Breitgand | G06F 9/45533 718/1 |

(Continued)

OTHER PUBLICATIONS

Canturk et al., "Virtual Machine Demand Estimation", US Patent Publication No. 2011/0072138A1 published Mar. 24, 2011.

(Continued)

*Primary Examiner* — Umut Onat
(74) *Attorney, Agent, or Firm* — Maeve Carpenter (57) ABSTRACT

A tool for autoscaling applications in a shared cloud resource environment. The tool registers, by one or more computer processors, one or more trigger conditions. The tool initiates, by one or more computer processors, a scaling event based, at least in part, on at least one of the one or more trigger conditions. The tool determines, by one or more computer processors, a scaling decision for the scaling event based, at least in part, on one or more scaling rules related to the one or more trigger conditions.

17 Claims, 4 Drawing Sheets

(56) References Cited

U.S. PATENT DOCUMENTS

| | | | | |
|---|---|---|---|---|
| 2014/0196039 A1* | 7/2014 | Kottomtharayil | ....... | G06F 9/505 |
| | | | | 718/1 |
| 2014/0304404 A1* | 10/2014 | Marr | ................ | G06F 9/45533 |
| | | | | 709/224 |
| 2015/0074679 A1* | 3/2015 | Fenoglio | ................ | G06F 9/505 |
| | | | | 718/104 |

OTHER PUBLICATIONS

Canturk et al., "Runtime Demand Estimation for Effective Dynamic Resource Management", NOMS, 2010 IEEE, pp. 381-388, <http://ieeexplore.ieee.org/stamp/stamp.jsp?tp=&arnumber=5488495>.

* cited by examiner

AUTOSCALING APPLICATIONS IN SHARED CLOUD RESOURCES

BACKGROUND OF THE INVENTION

The present invention relates generally to cloud computing, and more particularly to autoscaling applications in shared cloud resources.

Users of cloud computing systems assume unlimited capacity; however, in reality there exists a finite set of resources. Cloud computing systems attempt to dynamically allocate resources for user applications from this finite set of resources to provide the illusion of an unlimited capacity. Dividing a resource into a finer grained quantity, such as one virtual computer processing unit (vCPU), and assigning these grained quantities dynamically is one typical method used in autoscaling.

Cloud platforms as a service (PaaS) can contain hundreds of applications per virtual machine. As these applications receive traffic, the applications consume resources, and each application may consume different amounts of resources. When the capacity for a resource, such as computer processor unit (CPU) memory, of a virtual machine is saturated, some of the applications may need more resource capacity, while other applications do not.

SUMMARY

Aspects of an embodiment of the present invention disclose a method, system, and computer program product for autoscaling applications in a shared cloud resource environment. The method includes registering, by one or more computer processors, one or more trigger conditions. The method includes initiating, by one or more computer processors, a scaling event based, at least in part, on at least one of the one or more trigger conditions. The method includes determining, by one or more computer processors, a scaling decision for the scaling event based, at least in part, on one or more scaling rules related to the one or more trigger conditions.

DETAILED DESCRIPTION

Embodiments of the present invention recognize that allowing users to set their own scaling rules ignores the fact that cloud resources are finite. As such, as more and more applications compete for shared cloud resources, performance is impacted for other users of the shared cloud resources, as total usage requirements reach cloud resource limits.

Embodiments of the present invention provide the capability to scale cloud resources by utilizing intelligent autoscaling processes to decide when and by how much to scale cloud resources based on a variety of metrics including CPU, memory, network utilization, and a rate of change (i.e., demand) in each of those metrics.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise of copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processors, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
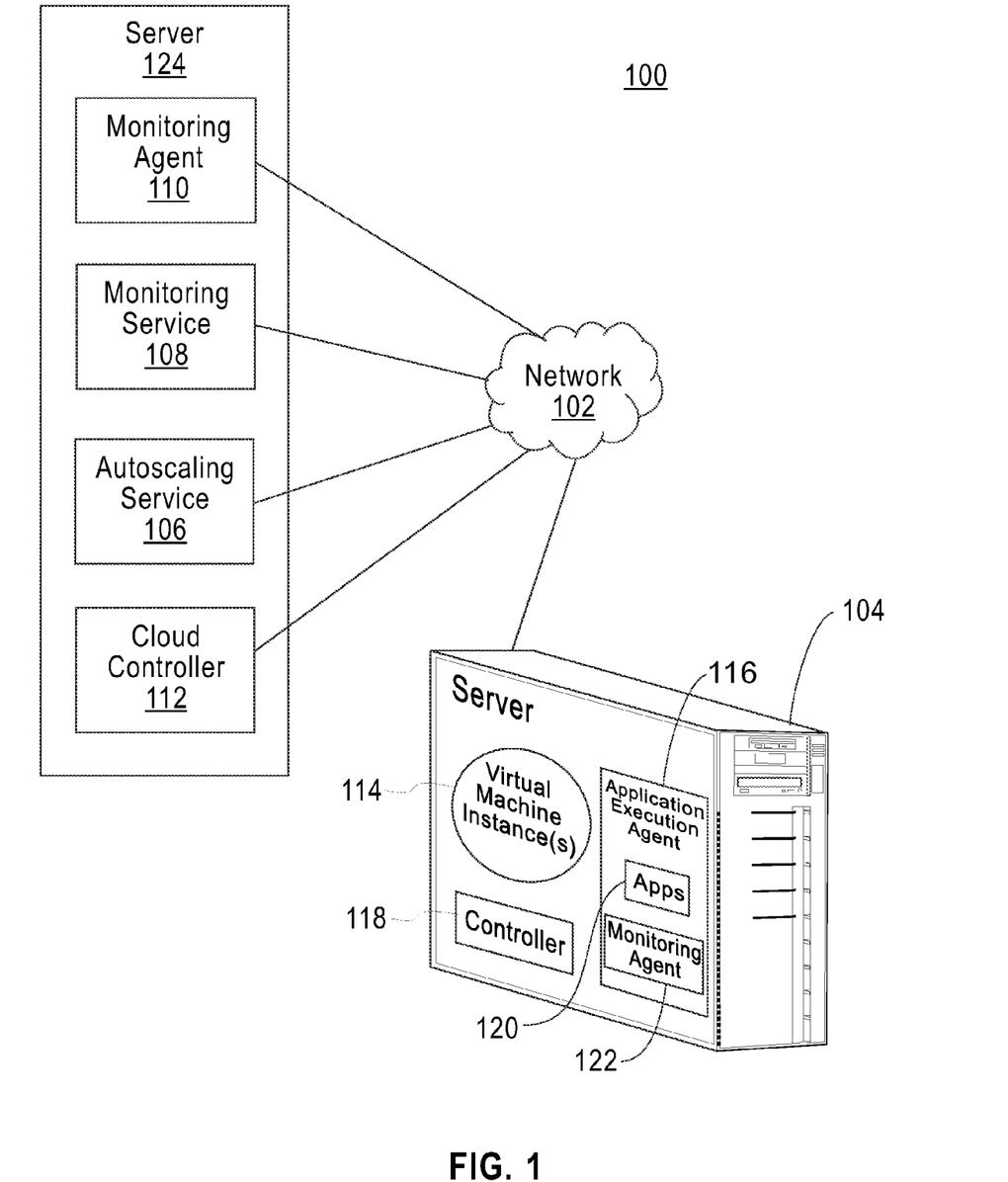
FIG. 1 illustrates a functional block diagram depicting a data processing environment, generally designated 100, in accordance with an embodiment of the present invention.

The present invention will now be described in detail with reference to Figures. FIG. 1 is a functional block diagram illustrating a data processing environment, generally designated 100, including a network 102, a server 104, and a server 124, in accordance with an embodiment of the present invention in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the exemplary embodiment, server 104 may be, for example, a server computer system such as a management server, web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes a virtual machine instance(s) 114, an application execution agent 116, and a controller 118.

In the exemplary embodiment, server 124 may be, for example, a server computer system such as a management server, web server, or any other electronic device or computing system capable of sending and receiving data. In another embodiment, server 124 may be a data center, consisting of a collection of networks and servers providing an IT service, such as virtual servers and applications deployed on virtual servers, to an external party. In another embodiment, server 124 represents a "cloud" of computers interconnected by one or more networks, where server 124 is a computing system utilizing clustered computers and components to act as a single pool of seamless resources when accessed through network 102. This is a common implementation for data centers in addition to cloud computing applications. In the exemplary embodiment, server 124 includes an autoscaling service 106, a monitoring service 108, a monitoring agent 110, and a cloud controller 112.

In the exemplary embodiment, virtual machine instance (s) 114 may be, for example, an emulation of a particular computer system, operating based on computer architecture and functions of a real or hypothetical computer as configured by, for example, server 104. In one embodiment, virtual machine instance(s) 114 includes both virtual machine instances as well as application containers. Virtual machine instance(s) 114 implementations may involve specialized hardware, software, or a combination of both.

In the exemplary embodiment, application execution agent 116 is a software based component capable of managing application instances, tracking started application instances, and broadcasting state messages regarding application instances. In the exemplary embodiment, application execution agent 116 stages (i.e., utilizes an appropriate build pack to stage the application, resulting in a droplet, i.e., an application instance) and executes applications within server 104. Application execution agent 116 manages the lifecycle of each application instance running in it, starting and stopping droplets upon request of cloud controller 112. Application execution agent 116 monitors the state of a started application instance, and periodically broadcasts application state messages. In the exemplary embodiment, apps 120 are applications within application execution agent 116. In the exemplary embodiment, application execution agent 116 includes a monitoring agent 122 for monitoring state information related to apps 120 in application execution agent 116 and communicating the state information to monitoring agent 110.

In the exemplary embodiment, controller 118 is a collection of routers, controllers, and other cloud components responsible for creating and supporting virtual machine instances, such as virtual machine instance(s) 114.

In the exemplary embodiment, autoscaling service 106 is a software based component capable of scaling resources for applications demanding additional capacity based, at least in part, on monitoring system metrics. For example, based, at least in part, on monitor information related to a queue waiting time, autoscaling service 106 can allocate additional resources on one or more virtual machine instances dynamically to meet the needs of applications within a highly shared environment. In the exemplary embodiment, autoscaling service 106 determines whether to scale-up aggressively or scale-down conservatively to fill in the needs for global and local application resource usage, wherein autoscaling occurs on a per application basis (i.e., autoscaling is not affected by placement imperfections, load balancing imperfections, or environment implementation and fluctuation). In the exemplary embodiment, autoscaling service 106 receives a list of applications to determine a scaling event, a list of trigger conditions (i.e., conditions that, when present, trigger a scaling event, i.e., a scale-up or scale-down of resources), and a list of autoscaling actions (i.e., rules and policies for scaling events) from a user interface (not shown) or database (not shown).

In the exemplary embodiment, monitoring service 108 is a software based component capable of monitoring application instances and virtual machine instances for metric information, such as states of virtual machine instances and states of application instances relating to computer processor usage, total number of CPUs, total CPU capacity, idle CPU capacity, memory, network utilization of application instances, runtime information, memory and network bandwidth, and number of virtual machine and application instances, etc. In the exemplary embodiment, monitoring service 108 monitors metrics to determine whether a registered trigger condition occurs. Where monitoring service 108 determines a registered trigger condition exists, monitoring service 108 initiates a scaling event with autoscaling service 106, wherein autoscaling service determines a scaling decision for the scaling event, i.e., scale-up or scale-down, for resources.

In the exemplary embodiment, monitoring agent 110 is a software based component capable of reporting metric information related to server 104, including, without limitation, application instance(s) metrics and virtual machine(s) metrics, to monitoring service 108. In the exemplary embodiment, monitoring agent 110 can be fully integrated, partially integrated, or separate from server 104. In one embodiment, monitoring agent 110 operates on a per application instance basis (i.e., one monitoring agent per application). In the exemplary embodiment, monitoring agent 110 gathers metric information from server 104, such as queue wait time and computer processor usage, and reports the metric information to monitoring service 108. In the exemplary embodiment, monitoring agent 110 retrieves a list of metrics to capture from monitoring service 108 and reports metric values for each of the metrics from the list of metrics back to monitoring service 108 periodically.

In the exemplary embodiment, cloud controller 112 is a software based component capable of determining application execution agents and zones to place an application instance(s), such as apps 120, based, at least in part, on availability and zone policies. For example, when a new application or a new version of an application is pushed to server 104, cloud controller 112 selects a application execution agent, such as application execution agent 116, from the pool of available application execution agents to stage the application. In the exemplary embodiment, cloud controller 112 performs a scaling-up or scaling-down of resources based, at least in part, on a scaling determination and one or more scaling rules from autoscaling service 106.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, autoscaling service 106, monitoring service 108, monitoring agent 110, and cloud controller 112 are interconnected by network 102. Network 102 can be any combination of connections and protocols capable of supporting communications between server 104, server 124, autoscaling service 106, monitoring service 108, monitoring agent 110, and cloud controller 112. Network 102 may also be implemented as a number of different types of networks, such as an intranet, a local area network (LAN), a virtual local area network (VLAN), or a wide area network (WAN).

A person having ordinary skill in the art can understand that FIG. 1 is intended as an example, and not as an architectural limitation for the different embodiments.

Figure 2:
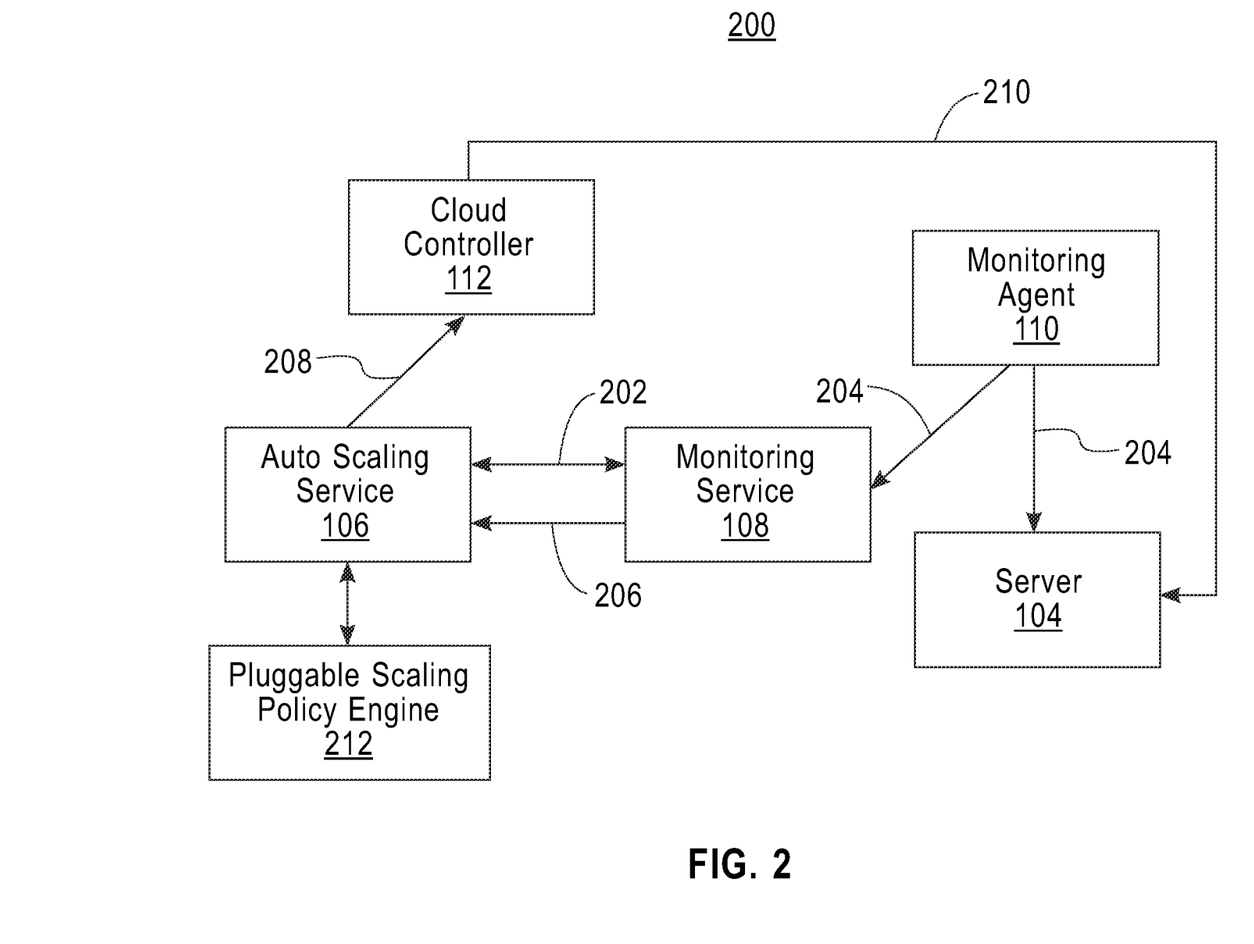
FIG. 2 illustrates a functional block diagram, generally designated 200, depicting steps for autoscaling applications in the data processing environment of FIG. 1, in accordance with an embodiment of the present invention.

FIG. 2 illustrates a functional block diagram depicting steps for autoscaling applications in a shared cloud resource environment, in accordance with an embodiment of the present invention.

Autoscaling service 106 registers triggers with monitoring service 108 (202). In the exemplary embodiment, autoscaling service 106 registers triggers with monitoring service 108, wherein triggers include, without limitation, conditions for when to determine scaling decisions (i.e., initiating a scaling event) based, at least in part, on measurement metrics, such as states of virtual machine instances and states of application instances related to computer processor usage, total number of CPUs, total CPU capacity, idle CPU capacity, memory, network utilization of application instances, runtime information, memory and network bandwidth, and number of virtual machine and application instances, etc. For example, a trigger may be set for mean CPU usage greater than eighty percent and mean available CPU capacity less than twenty percent, such that when CPU usage is greater than eighty percent, or CPU capacity falls below twenty percent, monitoring service 108 initiates a scaling event with autoscaling service 106. The steps of monitoring service 108 for initiating a scaling event are discussed in further detail in FIG. 3.

Monitoring agent 110 reports a plurality of metric information to server 104 and monitoring service 108 (204). In the exemplary embodiment, monitoring agent 110 gathers a plurality of predefined metrics relating to virtual machine instances and application instances within server 104. The plurality of predefined metrics include, without limitation, states of virtual machine instances and states of application instances related to computer processor usage, total number of CPUs, total CPU capacity, idle CPU capacity, memory, network utilization of application instances, runtime information, memory and network bandwidth, and number of virtual machine and application instances, etc. In the exemplary embodiment, monitoring agent 110 reports the plurality of metrics to monitoring service 108 periodically. For example, monitoring agent 110 may continuously retrieve the plurality of predefined metrics and report the metric information to monitoring service 108 every few minutes. Monitoring agent 110 determines a trigger condition exists when at least one of the plurality of predefined metrics gathered relating to virtual machine and application instances matches at least one of a plurality of trigger conditions.

In response to monitoring service 108 determining a trigger condition exists, monitoring service 108 initiates a scaling event within autoscaling service 106, wherein a scaling event includes determining a decision for scaling application instances based, at least in part, on a scaling policy (206). In the exemplary embodiment, autoscaling service 106 evaluates rules provided by pluggable scaling policy engine 212 to determine when to scale in and scale out, how much to scale in and scale out, and to enforce a scaling decision. Pluggable scaling policy engine 212 is a software component that can be fully integrated, partially integrated, or separate from autoscaling service 106 for setting scaling policy rules. The steps of autoscaling service 106 for determining a decision for scaling application instances are discussed in further detail in FIG. 3.

Autoscaling service 106 requests cloud controller 112 to perform a scaling action (208). In the exemplary embodiment, in response to determining a scaling decision, autoscaling service 106 requests cloud controller 112 to enforce the scaling decision.

In response to receiving a request to perform a scaling action, cloud controller 112 enforces the scaling decision (210). In the exemplary embodiment, cloud controller 112 enforces the scaling decision by determining one or more application execution agents to place application instances. Cloud controller 112 determines the one or more application execution agents by referencing availability and zone policies found within pluggable scaling policy engine 212. Cloud controller 112 enforces the scaling decision by scaling-up or scaling-down the number of virtual machine instances and the number of application instances occupying a virtual machine instance, based, at least in part, on application instance metrics and virtual machine instance metrics.

Figure 3:
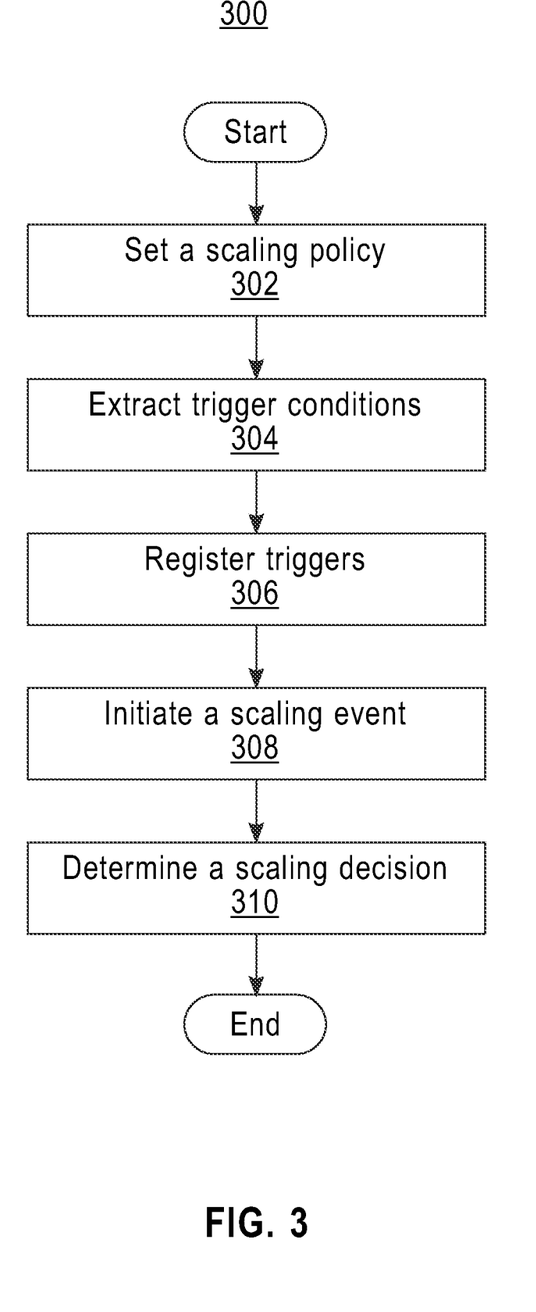
FIG. 3 illustrates a flowchart of an exemplary process flow, generally designated 300, for autoscaling applications in the data processing environment of FIG. 1, in accordance with an embodiment of the present invention

FIG. 3 is a flowchart illustrating the steps for autoscaling applications in a shared cloud resource environment, generally designated 300, in accordance with an embodiment of the present invention.

Pluggable scaling policy engine 212 sets a scaling policy (302). In the exemplary embodiment, pluggable scaling policy engine 212 sets a scaling policy with autoscaling service 106. Pluggable scaling policy engine 212 configures a scaling policy based on user input related to cloud resource management. In the exemplary embodiment, the scaling policy includes, without limitation, one or more trigger conditions, and one or more scaling rules for scaling-up and scaling-down shared cloud resources based, at least in part, on the one or more trigger conditions. In one embodiment, the one or more trigger conditions relate to various states of a plurality of measurement metrics, including, without limitation, states of virtual machine instances and states of application instances relating to computer processor usage, total number of CPUs, total CPU capacity, idle CPU capacity, memory, network utilization of application instances, runtime information, memory and network bandwidth, and number of virtual machine and application instances, etc. In one embodiment, the one or more rules for scaling-up and scaling-down shared cloud resources can include, without limitation, rules to scale-up aggressively (i.e., when application needs more resources than presently allocated) where there exists no lack of resources (i.e., application can benefit from more resources when there exists direct or indirect waiting for such resources), and rules to scale-down (i.e., when application utilizes less resources than presently provisioned) conservatively where limited resources are available (i.e., resource idleness can be used to determine scaling-down). In the exemplary embodiment, the one or more rules establish upper and lower thresholds for state conditions and monitor information, such that when the upper and lower thresholds are exceeded (i.e., a trigger condition exists), a scaling action automatically reallocates resources to bring shared resources within established upper and lower thresholds (i.e., scaling rules). For example, a scale-up rule may be expressed in terms of an empirical formula AVG(CPU_Utilization)>Upper Threshold, such that when a cumulative or average CPU utilization of an application instance exceeds an upper threshold of, for example, eighty percent, a scale-up event initiates.

Autoscaling service 106 extracts trigger conditions from the scaling policy (304). In the exemplary embodiment, autoscaling service 106 extracts one or more trigger conditions from the scaling policy by referencing the one or more trigger conditions provided in the scaling policy and select each of the one or more trigger conditions relevant to the scope of autoscaling desired. For example, if it is desirable to autoscale applications when a certain percentage of CPU capacity is exceeded, autoscaling policy will extract each of the one or more trigger conditions relevant to CPU capacity by selecting each of the one or more trigger conditions provided in the scaling policy pertaining to CPU capacity.

Autoscaling service 106 registers triggers with monitoring service 108 (306). In the exemplary embodiment, autoscaling service 106 registers triggers with monitoring service 108 to enable monitoring service 108 to monitor information related to application instance(s) and virtual machine metrics to determine whether a trigger condition exists. For example, monitoring service 108 monitors application usage information for a particular application instance relative to available resources on a virtual machine instance, and if the usage information indicates that the application uses greater than eighty percent of the resources, monitoring service 108 initiates a scaling event within autoscaling service 106, wherein the scaling event may include adding a new virtual machine to handle the application usage requirements. In another example, monitoring service 108 may determine that an application's wait time for a CPU exceeds a particular wait time threshold, the application's memory is occupied, and the application's input/output is blocked. Monitoring service 108 correlates these conditions to determine whether a trigger condition exists, and if so, notifies autoscaling service 106 to initiate a scaling event to either scale-up or scale-down based on the present conditions.

In response to determining a trigger condition exists, monitoring service 108 initiates a scaling event within autoscaling service 106 (308). In the exemplary embodiment, monitoring service 108 initiates a notification to autoscaling service 106 that a trigger condition exists, prompting autoscaling service 106 to determine a scaling decision based, at least in part, on the one or more rules related to the trigger condition.

In response to receiving a notification to initiate a scaling event, autoscaling service 106 determines a scaling decision (310). In the exemplary embodiment, autoscaling service 106 determines a scaling decision based, at least in part, on the one or more rules set forth by pluggable scaling policy engine 212. For example, for resources such as memory, in the situation where monitoring service 108 monitors an increase in memory usage over certain time intervals, monitoring service 108 may determine that an application hit the limit of its memory allocation (e.g., 1G per instance), or monitoring service 108 may determine that the application did not hit its memory allocation limit, however, the application is constrained to a smaller amount of memory than provisioned, autoscaling service 106 can scale-up aggressively or conservatively according to a growth rate in memory. In one embodiment, auto scaling service 106 determines scaling decisions continuously by applying empirical formulas when predefined thresholds are exceeded to scale-up virtual machine instances to meet the needs of an application. However, as a result of scaling based on demand, applications can have more virtual machine instances allocated to them than necessary, and as such, autoscaling program 106 consolidates unused resources periodically. For example, after aggressively scaling up to meet application demands, autoscaling service 106 provisions ten virtual machine instances to an application. However, where four virtual machine instances can satisfy the demands of the application, autoscaling service 106 periodically consolidates by scaling down the number of virtual machine instances from ten to four, thereby freeing up resources for other applications in the shared cloud environment.

A person having ordinary skill in the art can understand that scaling rules, thresholds, trigger conditions, monitoring metrics, and the like are fully configurable, and may include other examples not included in the foregoing discussion.

Figure 4:
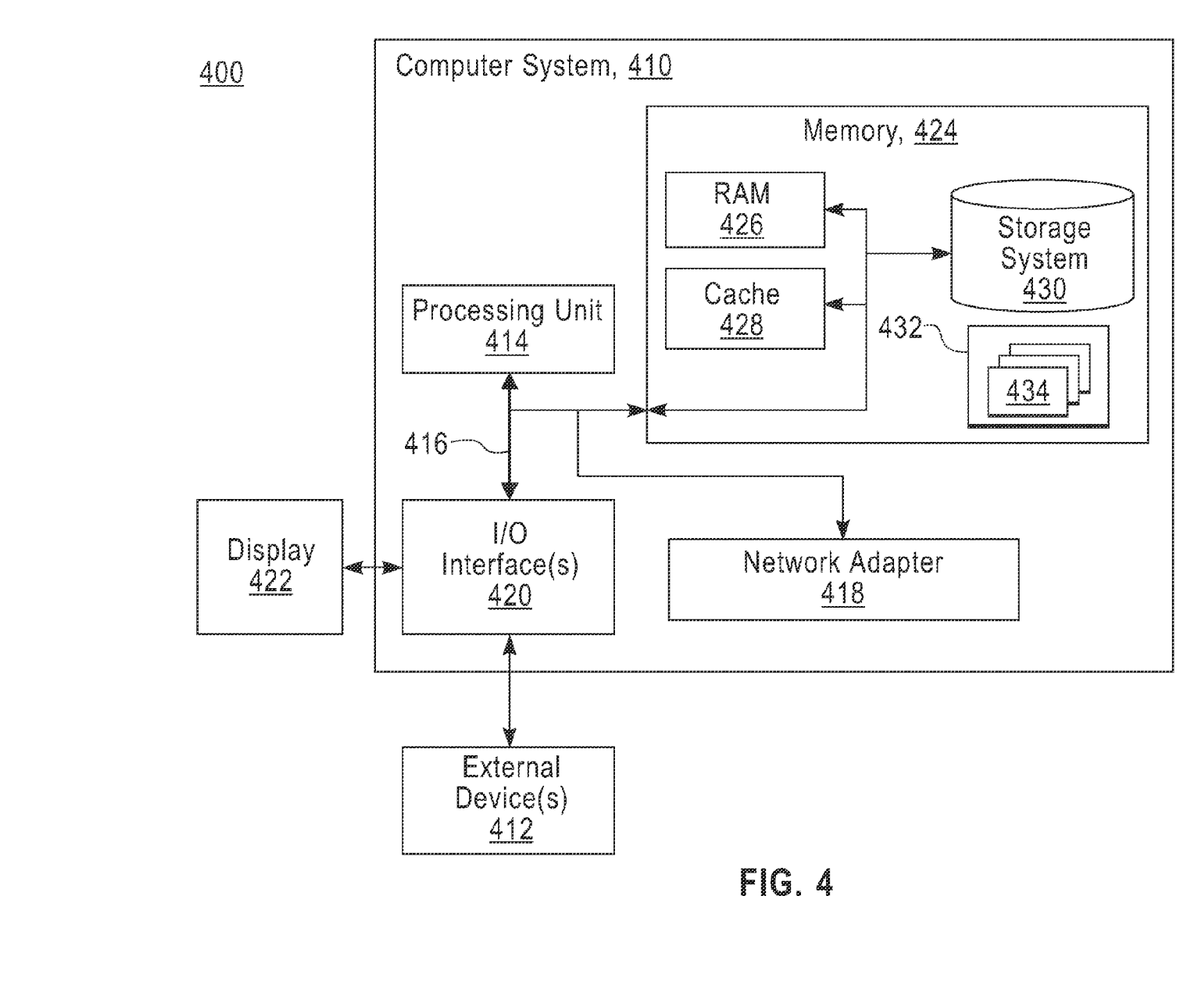
FIG. 4 is a block diagram depicting components of a data processing system (such as server 104 and server 124 of FIG. 1), in accordance with an embodiment of the present invention.

FIG. 4 is a block diagram depicting components of a data processing system (such as server 104 and server 124 of FIG. 1), generally designated 400, in accordance with an embodiment of the present invention. It should be appreciated that FIG. 4 provides only an illustration of one implementation and does not imply any limitations with regard to the environments in that different embodiments can be implemented. Many modifications to the depicted environment can be made.

In the illustrative embodiment, server 104 and 124 in data processing environment 100 are shown in the form of a general-purpose computing device, for example, a computer system 410. The components of computer system 410 can include, but are not limited to, one or more processors or processing unit 414, memory 424, and bus 416 that couples various system components including memory 424 to processing unit 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media can be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 can further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 can include at least one computer program product having a set (e.g., at least one) of program modules that are configured to carry out the functions of embodiments of the invention.

Program/utility 432, having one or more sets of program modules 434, can be stored in memory 424 by way of example, and not limitation, as well as an operating system, one or more application programs, other program modules, and program data. Each of the operating systems, one or more application programs, other program modules, and program data, or some combination thereof, can include an implementation of a networking environment. Program modules 434 generally carry out the functions and/or methodologies of embodiments of the invention as described herein. Computer system 410 can also communicate with one or more external devices 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems can be used in conjunction with computer system 410.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for autoscaling applications in a shared cloud resource environment, the method comprising:

registering, by one or more computer processors, one or more trigger conditions;

extracting, by the one or more computer processors, the one or more trigger conditions from a scaling policy, wherein extracting includes selecting at least one of the one or more trigger conditions relevant to a scope of autoscaling;

monitoring, by the one or more computer processors, a plurality of application instance metrics and a plurality of virtual machine instance metrics to determine whether the at least one of the one or more trigger conditions exist;

initiating, by the one or more computer processors, a scaling event based, at least in part, on a determination that the at least one of the one or more trigger conditions exist;

determining, by the one or more computer processors, a scaling decision for the scaling event based, at least in part, on one or more scaling rules related to the at least one of the one or more trigger conditions; and enforcing, by the one or more computer processors, the scaling decision for the scaling event, wherein enforcing the scaling decision for the scaling event includes determining one or more application execution agents to place one or more application instances by referencing availability and zone policies found within a scaling policy and scaling a number of virtual machine instances and a number of application instances occupying a virtual machine instance, based, at least in part, on the plurality of application instance metrics, the plurality of virtual machine instance metrics and the one or more scaling rules, wherein scaling occurs on demand on a per application basis.

2. The method of claim 1, wherein extracting the one or more trigger conditions from the scaling policy further comprises setting, by the one or more computer processors, the scaling policy based, at least in part, on user input, wherein the scaling policy includes the one or more trigger conditions and the one or more scaling rules related to the one or more trigger conditions.

3. The method of claim 1, wherein initiating the scaling event based, at least in part, on at least one of the one or more trigger conditions further comprises determining, by the one or more computer processors, at least one of the one or more trigger conditions exist, wherein determining at least one of the one or more trigger conditions exist includes matching at least one of a plurality of predefined metrics relating to the shared cloud resource environment.

4. The method of claim 3, wherein determining at least one of the one or more trigger conditions exist further comprises gathering, by the one or more computer processors, the plurality of predefined metrics relating to the shared cloud resource environment, wherein the plurality of predefined metrics include one or more of:
   state information relating to one or more virtual machine instances;
   state information related to one or more application instances;
   a computer processor usage;
   a total number of computer processor units;
   a total Computer Processing Unit (CPU) capacity;
   an idle CPU capacity;
   a memory and network utilization by the one or more application instances;
   runtime information;
   a memory and network bandwidth; and
   a number of the one or more virtual machine instances and the one or more application instances.

5. The method of claim 1, wherein determining the scaling decision for the scaling event further comprises determining, by the one or more computer processors, whether to scale-up or scale-down shared resources based, at least in part, on the one or more rules relating to the at least one trigger condition existing in the shared cloud resource environment.

6. The method of claim 1, wherein enforcing the scaling decision for the scaling event includes at least one of:
   scaling-up, by the one or more computer processors, a number of virtual machine instances and a number of application instances occupying a virtual machine instance based, at least in part, on the scaling decision; and
   scaling-down, by the one or more computer processors, a number of virtual machine instances and a number of application instances occupying a virtual machine instance based, at least in part, on the scaling decision.

7. A computer program product for autoscaling applications in a shared cloud resource environment, the computer program product comprising:
   one or more computer readable storage media and program instructions stored on the one or more computer readable storage media, the program instructions comprising:
   program instructions to register, by one or more computer processors, one or more trigger conditions;
   program instructions to extract the one or more trigger conditions from a scaling policy, wherein extracting includes selecting at least one of the one or more trigger conditions relevant to a scope of autoscaling;
   program instructions to monitor a plurality of application instance metrics and a plurality of virtual machine instance metrics to determine whether the at least one of the one or more trigger conditions exist;
   program instructions to initiate, by the one or more computer processors, a scaling event based, at least in part, on a determination that the at least one of the one or more trigger conditions exist;
   program instructions to determine, by the one or more computer processors, a scaling decision for the scaling event based, at least in part, on one or more scaling rules related to the at least one of the one or more trigger conditions; and
   program instructions to enforce, by the one or more computer processors, the scaling decision for the scaling event, wherein enforcing the scaling decision for the scaling event includes determining one or more application execution agents to place one or more application instances by referencing availability and zone policies found within a scaling policy and scaling a number of virtual machine instances and a number of application instances occupying a virtual machine instance, based, at least in part, on the plurality of application instance metrics, the plurality of virtual machine instance metrics and the one or more scaling rules, wherein scaling occurs on demand on a per application basis.

8. The computer program product of claim 7, wherein the program instructions to extract the one or more trigger conditions from the scaling policy further comprise program instructions to set, by the one or more computer processors, the scaling policy based, at least in part, on user input, wherein the scaling policy includes the one or more trigger conditions and the one or more scaling rules related to the one or more trigger conditions.

9. The computer program product of claim 7, wherein the program instructions to initiate the scaling event based, at least in part, on at least one of the one or more trigger conditions further comprise program instructions to determine, by the one or more computer processors, at least one of the one or more trigger conditions exist, wherein determining at least one of the one or more trigger conditions exist includes matching at least one of a plurality of predefined metrics relating to the shared cloud resource environment.

10. The computer program product of claim 9, wherein the program instructions to determine at least one of the one or more trigger conditions exist further comprise program instructions to gather, by the one or more computer processors, the plurality of predefined metrics relating to the shared cloud resource environment, wherein the plurality of predefined metrics include one or more of:
   state information relating to one or more virtual machine instances;

state information related to one or more application instances;
a computer processor usage;
a total number of computer processor units;
a total Computer Processing Unit (CPU) capacity;
an idle CPU capacity;
a memory and network utilization by the one or more application instances;
runtime information;
a memory and network bandwidth; and
a number of the one or more virtual machine instances and the one or more application instances.

11. The computer program product of claim 7, wherein the program instructions to determine the scaling decision for the scaling event further comprise program instructions to determine, by the one or more computer processors, whether to scale-up or scale-down shared resources based, at least in part, on the one or more rules relating to the at least one trigger condition existing in the shared cloud resource environment.

12. The computer program product of claim 7, wherein enforcing the scaling decision includes at least one of:
scaling-up, by the one or more computer processors, a number of virtual machine instances and a number of application instances occupying a virtual machine instance based, at least in part, on the scaling decision; and
scaling-down, by the one or more computer processors, a number of virtual machine instances and a number of application instances occupying a virtual machine instance based, at least in part, on the scaling decision.

13. A computer system for autoscaling applications in a shared cloud resource environment, the computer system comprising:
one or more computer processors;
one or more computer readable storage media;
program instructions stored on at least one of the one or more computer readable storage media for execution by at least one of the one or more computer processors, the program instructions comprising:
program instructions to register, by one or more computer processors, one or more trigger conditions;
program instructions to extract the one or more trigger conditions from a scaling policy, wherein extracting includes selecting at least one of the one or more trigger conditions relevant to a scope of autoscaling;
program instructions to monitor a plurality of application instance metrics and a plurality of virtual machine instance metrics to determine whether the at least one of the one or more trigger conditions exist;
program instructions to initiate, by the one or more computer processors, a scaling event based, at least in part, on a determination that the at least one of the one or more trigger conditions exist;
program instructions to determine, by the one or more computer processors, a scaling decision for the scaling event based, at least in part, on one or more scaling rules related to the at least one of the one or more trigger conditions; and
program instructions to enforce, by the one or more computer processors, the scaling decision for the scaling event, wherein enforcing the scaling decision for the scaling event includes determining one or more application execution agents to place one or more application instances by referencing availability and zone policies found within a scaling policy and scaling a number of virtual machine instances and a number of application instances occupying a virtual machine instance, based, at least in part, on the plurality of application instance metrics, the plurality of virtual machine instance metrics and the one or more scaling rules, wherein scaling occurs on demand on a per application basis.

14. The computer system of claim 13, wherein the program instructions to extract the one or more trigger conditions from the scaling policy further comprise program instructions to set, by the one or more computer processors, the scaling policy based, at least in part, on user input, wherein the scaling policy includes the one or more trigger conditions and the one or more scaling rules related to the one or more trigger conditions.

15. The computer system of claim 13, wherein the program instructions to initiate the scaling event based, at least in part, on at least one of the one or more trigger conditions further comprise program instructions to determine, by the one or more computer processors, at least one of the one or more trigger conditions exist, wherein determining at least one of the one or more trigger conditions exist includes matching at least one of a plurality of predefined metrics relating to the shared cloud resource environment.

16. The computer system of claim 15, wherein the program instructions to determine at least one of the one or more trigger conditions exist further comprise program instructions to gather, by the one or more computer processors, the plurality of predefined metrics relating to the shared cloud resource environment, wherein the plurality of predefined metrics include one or more of:
state information relating to one or more virtual machine instances;
state information related to one or more application instances;
a computer processor usage;
a total number of computer processor units;
a total Computer Processing Unit (CPU) capacity;
an idle CPU capacity;
a memory and network utilization by the one or more application instances;
runtime information;
a memory and network bandwidth; and
a number of the one or more virtual machine instances and the one or more application instances.

17. The computer system of claim 13, wherein enforcing the scaling decision includes at least one of:
scaling-up, by the one or more computer processors, a number of virtual machine instances and a number of application instances occupying a virtual machine instance based, at least in part, on the scaling decision; and
scaling-down, by the one or more computer processors, a number of virtual machine instances and a number of application instances occupying a virtual machine instance based, at least in part, on the scaling decision.

* * * * *